(12) United States Patent
Tanaka

(10) Patent No.: US 9,373,869 B2
(45) Date of Patent: Jun. 21, 2016

(54) BIPOLAR ALL-SOLID-STATE BATTERY

(75) Inventor: Takumi Tanaka, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/114,838

(22) PCT Filed: May 27, 2011

(86) PCT No.: PCT/JP2011/062205
§ 371 (c)(1),
(2), (4) Date: Nov. 27, 2013

(87) PCT Pub. No.: WO2012/164642
PCT Pub. Date: Dec. 6, 2012

(65) Prior Publication Data
US 2014/0079992 A1 Mar. 20, 2014

(51) Int. Cl.
*H01M 4/13* (2010.01)
*H01M 10/42* (2006.01)
*H01M 10/0585* (2010.01)
*H01M 10/0562* (2010.01)
*H01M 10/04* (2006.01)
*H01M 10/052* (2010.01)
*H01M 10/12* (2006.01)
*H01M 10/28* (2006.01)
*H01M 10/18* (2006.01)
*H01M 4/70* (2006.01)

(52) U.S. Cl.
CPC ...... *H01M 10/4235* (2013.01); *H01M 10/0418* (2013.01); *H01M 10/052* (2013.01); *H01M 10/0562* (2013.01); *H01M 10/0585* (2013.01); *H01M 4/70* (2013.01); *H01M 10/127* (2013.01); *H01M 10/18* (2013.01); *H01M 10/282* (2013.01); *Y02E 60/122* (2013.01); *Y02T 10/7011* (2013.01)

(58) Field of Classification Search
CPC .. H01M 10/18; H01M 10/282; H01M 10/127
See application file for complete search history.

(56) References Cited

U.S. PATENT DOCUMENTS

2005/0284750 A1 12/2005 Nishimura et al.
2009/0233164 A1* 9/2009 Shimamura et al. .......... 429/149

FOREIGN PATENT DOCUMENTS

| CN | 1123473 A | 5/1996 |
|---|---|---|
| JP | A-2004-253155 | 9/2004 |
| JP | A-2005-353377 | 12/2005 |
| JP | 2007-257859 A | 10/2007 |
| JP | 2010-250978 A | 11/2010 |

* cited by examiner

*Primary Examiner* — Jane Rhee
(74) *Attorney, Agent, or Firm* — Oliff PLC

(57) ABSTRACT

Provided is a bipolar all-solid-state battery capable of preventing breakage of a current collector of a bipolar electrode to suitably prevent a short circuit from occurring, and a method for producing the above-mentioned bipolar all-solid-state battery. The bipolar all-solid-state battery includes: a bipolar electrode having a current collector and an electrode active material layer including a cathode active material layer containing a cathode active material, formed on one surface of the current collector, and an anode active material layer containing an anode active material, formed on the other surface of the current collector, and a solid electrolyte layer containing a solid electrolyte. The bipolar all-solid-state battery has a plurality of the bipolar electrodes laminated via the solid electrolyte layer and a reinforcing layer formed on the surface of the current collector is disposed between the end of the electrode active material layer and the surface of the current collector.

4 Claims, 4 Drawing Sheets

BIPOLAR ALL-SOLID-STATE BATTERY

TECHNICAL FIELD

The present invention relates to a bipolar all-solid-state battery capable of suitably preventing a short circuit from occurring by breakage of a current collector of a bipolar electrode, and a producing method thereof.

BACKGROUND ART

In accordance with a rapid spread of information relevant apparatuses and communication apparatuses such as a personal computer, a video camera and a portable telephone in recent years, the development of a battery to be utilized as a power source thereof has been emphasized. The development of a high-output and high-capacity battery for an electric automobile or a hybrid automobile has been advanced also in the automobile industry. A lithium battery has been presently noticed from the viewpoint of a high energy density among various kinds of batteries.

Liquid electrolyte containing a flammable organic solvent is used for a presently commercialized lithium battery, so that the installation of a safety device for restraining temperature rise during a short circuit and the improvement in structure and material for preventing the short circuit are necessary therefor. On the contrary, a lithium battery all-solidified by replacing the liquid electrolyte with a solid electrolyte layer is conceived to intend the simplification of the safety device and be excellent in production cost and productivity for the reason that the flammable organic solvent is not used in the battery.

Also, a laminated bipolar battery, which allows a high energy density and a high output density, is noticed as the above-mentioned lithium battery for an electric automobile. The bipolar battery is such that a bipolar electrode, in which a cathode active material layer is formed on one plane of a current collector and an anode active material layer is formed on the other plane thereof, and an electrolyte are alternately laminated.

Here, the bipolar battery has a constitution such that the plural bipolar electrodes are laminated, so that the problem is that there is a possibility that a short circuit is caused by contact between the current collectors and contact between an electrode active material layer and the current collector in an uneven portion at the end of the bipolar electrode. Then, in Patent Literature 1, it is disclosed that an insulating part made of an insulating material is provided on the current collector in the periphery of the bipolar electrode, where the electrode active material layer is not formed.

CITATION LIST

Patent Literature

Patent Literature 1: Japanese Patent Application Publication (JP-A) No. 2004-253155

SUMMARY OF INVENTION

Technical Problem

In a bipolar electrode, the problem is that it is difficult that a cathode active material layer and an anode active material layer are formed on each surface of a current collector while aligning the end of the cathode active material layer and the end of the anode active material layer with a high precision. Thus, in the case where there is position aberration in the end of the cathode active material layer and the end of the anode active material layer, the problem is that shearing force due to the position aberration (occasionally described as aberration shearing force hereinafter) is applied to the current collector, which is broken to cause a through hole and then a short circuit. In addition, metal foil of a thinner film is appropriately used as the current collector of a bipolar all-solid-state battery for the purpose of decreasing the volume of the battery, so that the problem is that a short circuit is easily caused by the above-mentioned breakage of the current collector. Incidentally, the problem of a short circuit due to the breakage of the current collector resulting from such aberration shearing force is not mentioned in Patent Literature 1.

The present invention has been made in view of the above-mentioned problem, and the main object thereof is to provide a bipolar all-solid-state battery capable of preventing breakage of a current collector of a bipolar electrode to suitably prevent a short circuit from occurring, and a method for producing the above-mentioned bipolar all-solid-state battery.

Solution to Problem

In order to solve the above-mentioned problem, the present invention provides a bipolar all-solid-state battery comprising: a bipolar electrode having a current collector and an electrode active material layer comprising a cathode active material layer containing a cathode active material, formed on one surface of the above-mentioned current collector, and an anode active material layer containing an anode active material, formed on the other surface of the above-mentioned current collector, and a solid electrolyte layer containing a solid electrolyte; the bipolar all-solid-state battery has a plurality of the above-mentioned bipolar electrodes laminated via the above-mentioned solid electrolyte layer, wherein the above-mentioned electrode active material layer is formed inside the end of the above-mentioned current collector, and a reinforcing layer formed on the surface of the above-mentioned current collector is disposed between the end of the above-mentioned electrode active material layer and the surface of the above-mentioned current collector.

According to the present invention, the reinforcing layer may be disposed between the end of the electrode active material layer and the surface of the current collector, so that the current collector in the vicinity of the end of the electrode active material layer may be reinforced. Therefore, durability against the above-mentioned aberration shearing force may be provided for the current collector, and a short circuit may be suitably prevented from occurring by breakage of the current collector. Therefore, the bipolar all-solid-state battery such that a short circuit due to breakage of the current collector is caused with difficulty may be obtained.

In the above-mentioned invention, the above-mentioned reinforcing layer is preferably an insulator. A short circuit may be suitably prevented from occurring in a portion where the reinforcing layer is formed.

In the above-mentioned invention, the end of the above-mentioned current collector is preferably covered with the insulator. The bipolar all-solid-state battery such that a short circuit due to contact between the current collectors adjacent in a lamination direction is caused with difficulty may be obtained.

Also, the present invention provides a method for producing the above-mentioned bipolar all-solid-state battery, comprising steps of: a bipolar electrode forming step of forming the reinforcing layer on the surface of the current collector so that the above-mentioned reinforcing layer is disposed between the end of an electrode active material layer forming region located inside the end of the above-mentioned current collector, where the electrode active material layer is formed, and the surface of the above-mentioned current collector to thereafter form the bipolar electrode by forming the above-mentioned electrode active material layer in the above-mentioned electrode active material layer forming region, a solid electrolyte layer forming step of forming the solid electrolyte layer, and an assembling step of assembling the bipolar all-solid-state battery by laminating a plurality of the above-mentioned bipolar electrodes via the above-mentioned solid electrolyte layer.

According to the present invention, the reinforcing layer may be disposed between the end of the electrode active material layer and the surface of the current collector by having the bipolar electrode forming step, so that the current collector in the vicinity of the end of the electrode active material layer may be reinforced, and durability against the above-mentioned aberration shearing force may be provided for the current collector. Therefore, the bipolar all-solid-state battery such that a short circuit due to breakage of the current collector is caused with difficulty may be produced.

Advantageous Effects of Invention

The present invention produces the effect such as to provide a bipolar all-solid-state battery capable of preventing breakage of a current collector in the vicinity of the end of the bipolar all-solid-state battery to suitably prevent a short circuit from occurring, and a method for producing the above-mentioned bipolar all-solid-state battery.

DESCRIPTION OF EMBODIMENTS

A bipolar all-solid-state battery and a method for producing the bipolar all-solid-state battery of the present invention are hereinafter described.

A. Bipolar all-Solid-State Battery

First, a bipolar all-solid-state battery of the present invention is described. The bipolar all-solid-state battery of the present invention comprises: a bipolar electrode comprising a current collector and an electrode active material layer including a cathode active material layer containing a cathode active material, formed on one surface of the above-mentioned current collector, and an anode active material layer containing an anode active material, formed on the other surface of the above-mentioned current collector, and a solid electrolyte layer containing a solid electrolyte; the bipolar all-solid-state battery has a plurality of the above-mentioned bipolar electrodes laminated via the above-mentioned solid electrolyte layer, characterized in that the above-mentioned electrode active material layer is formed inside the end of the above-mentioned current collector, and a reinforcing layer formed on the surface of the above-mentioned current collector is disposed between the end of the above-mentioned electrode active material layer and the surface of the above-mentioned current collector.

Incidentally, "a plurality of the bipolar electrodes laminated via the solid electrolyte layer" signifies that a plurality of the bipolar electrodes is laminated so that the solid electrolyte layer is disposed between the cathode active material layer of a bipolar electrode and the anode active material layer of another bipolar electrode adjacent to the above-mentioned bipolar electrode.

Also, "the reinforcing layer is disposed between the end of the electrode active material layer and the surface of the current collector" in the present invention signifies that the reinforcing layer is disposed between the end of at least one electrode active material layer among the end of the cathode active material layer and the end of the anode active material layer and the surface of the current collector. Also, this case signifies that the reinforcing layer is formed on the surface of at least one current collector.

Figure 1:
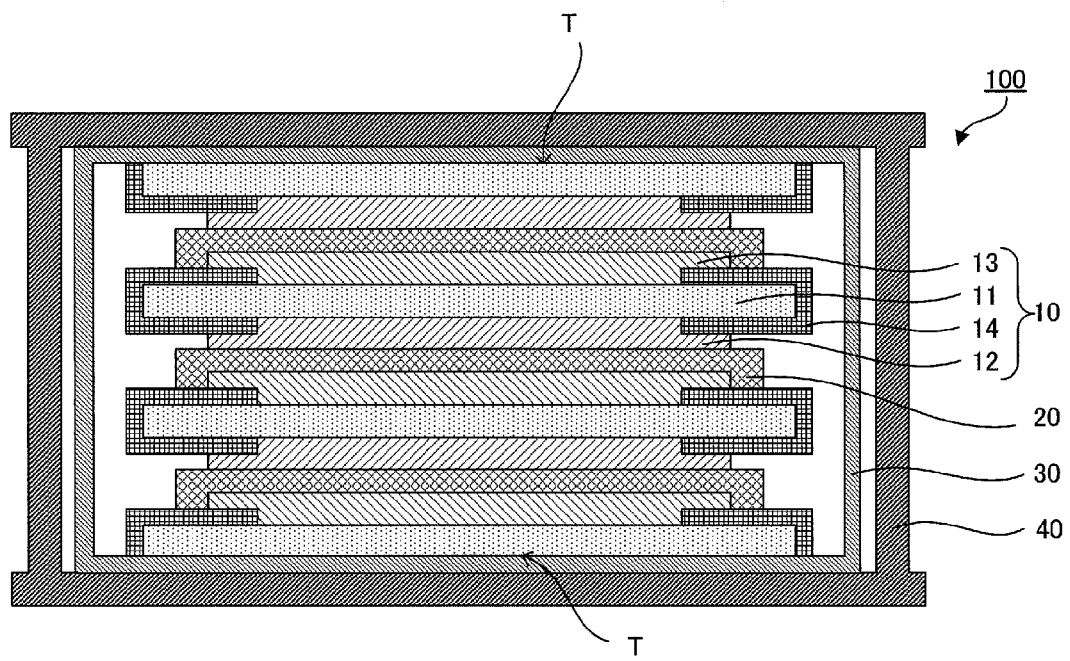
FIG. 1 is a schematic cross-sectional view showing an example of a bipolar all-solid-state battery of the present invention.

Here, the bipolar all-solid-state battery of the present invention is described using the drawings. FIG. 1 is a schematic cross-sectional view showing an example of the bipolar all-solid-state battery of the present invention. As shown in FIG. 1, a bipolar all-solid-state battery 100 of the present invention comprises: a bipolar electrode 10 having a current collector 11, an electrode active material layer comprising a cathode active material layer 12 containing a cathode active material, formed on one surface of the current collector 11, and an anode active material layer 13 containing an anode active material, formed on the other surface of the current collector 11, and a reinforcing layer 14 formed on the surface of the current collector 11, and a solid electrolyte layer 20 containing a solid electrolyte; and the bipolar all-solid-state battery has a plurality of the bipolar electrodes 10 laminated via the solid electrolyte layer 20. Also, the bipolar all-solid-state battery 100 of the present invention may have a battery case 30 and a restraint jig 40 in addition to the above-mentioned constitution.

Here, the bipolar all-solid-state electrode used for the present invention is described in further detail.

Figure 2A:
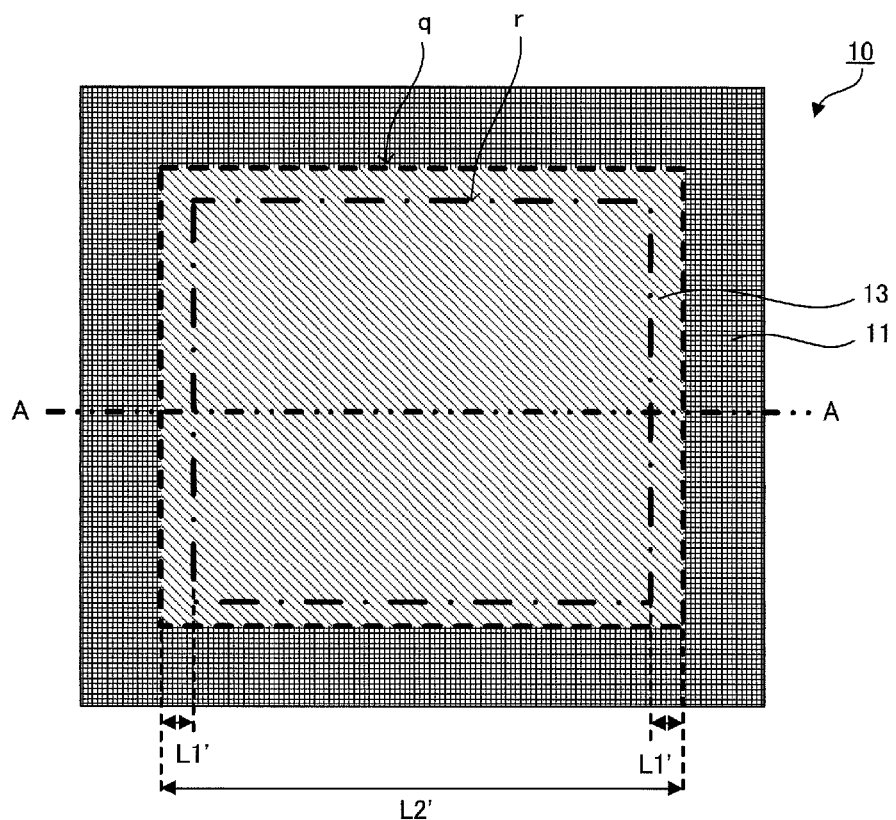
FIGS. 2A and 2B are each a schematic view showing an example of a bipolar electrode used for the present invention.
Figure 2B:
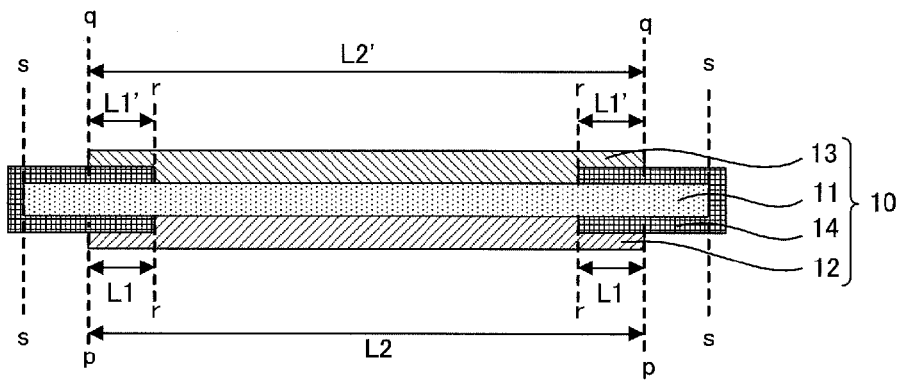

Also, FIG. 2A is a schematic plan view showing an example of the bipolar electrode used for the bipolar all-solid-state battery of the present invention, and FIG. 2B is an A-A line cross-sectional view of FIG. 2A. Incidentally, FIG. 2A is a view observing the bipolar electrode 10 from the side of the anode active material layer 13, and the current collector 11 and the cathode active material layer 12 are omitted. As shown in FIGS. 2A and 2B, in the present invention, on one surface of the current collector 11, the cathode active material layer 12 is formed inside the end "s" of the current collector 11, and the reinforcing layer 14 is disposed between the end "p" of the cathode active material layer 12 and the surface of the current collector 11, and the reinforcing layer 14 is formed continuously from the end "s" of the current collector 11 to the end "p" of the cathode active material layer 12. Also, on the other surface of the current collector 11, the anode active material layer 13 is formed inside the end "s" of the current collector 11, and the reinforcing layer 14 is disposed between the end "q" of the anode active material layer 13 and the surface of the current collector 11, and the reinforcing layer 14 is formed continuously from the end "s" of the current collector 11 to the end "q" of the anode active material layer 13. Incidentally, "r" in FIG. 2B denotes the end of the reinforcing layer 14 on the side of the electrode active material layer. Also, an alternate long and short dash line in FIG. 2A denotes the end "r" of the reinforcing layer 14 (on the side of the anode active material layer 13).

According to the present invention, the reinforcing layer may be disposed between the end of the electrode active material layer and the surface of the current collector, so that the current collector in the vicinity of the end of the electrode active material layer may be reinforced. Therefore, durability against the above-mentioned aberration shearing force may be provided for the current collector, and a short circuit may be suitably prevented from occurring by breakage of the current collector. Therefore, the bipolar all-solid-state battery such that a short circuit due to breakage of the current collector is caused with difficulty may be obtained.

Also, according to the present invention, the reinforcing layer is formed on the surface of the current collector and does not completely seal the outer periphery of the bipolar all-solid-state battery, so that even in the case where gas is generated from the solid electrolyte layer, the gas may be discharged out of the bipolar all-solid-state battery and the electrode active material layer may be suitably prevented from deteriorating.

Each constitution of the bipolar all-solid-state battery of the present invention is hereinafter described.

1. Bipolar Electrode

A bipolar electrode used for the present invention has a current collector, a cathode active material layer, an anode active material layer, and a reinforcing layer.

(1) Reinforcing Layer

The reinforcing layer used for the present invention is formed on the surface of the current collector, and is disposed between the end of the electrode active material layer and the surface of the current collector.

Such a reinforcing layer may allow the current collector to be reinforced, and may be an insulator or a conductor, but is preferably an insulator. The reason therefor is that the reinforcing layer as an insulator allows a short circuit to be suitably prevented from occurring in a portion where the reinforcing layer is formed.

A position where such a reinforcing layer is formed is not particularly limited if the current collector may be reinforced, but, for example, the reinforcing layer may be formed on one of the surface of the current collector on the side of the cathode active material layer and the surface of the current collector on the side of the anode active material layer, or on both of the surface of the current collector on the side of the cathode active material layer and the surface of the current collector on the side of the anode active material layer.

In the present invention, above all, the reinforcing layer is preferably formed on both of the surface of the current collector on the side of the cathode active material layer and the surface of the current collector on the side of the anode active material layer. The reason therefor is that durability of the current collector against the above-mentioned aberration shearing force may be further improved.

Also, a forming region of the reinforcing layer in the surface of the current collector is not particularly limited if the forming region is a position such as to allow the reinforcing layer to be disposed between the end of the electrode active material layer and the surface of the current collector. The forming region of the reinforcing layer is formed in consideration of an area for contributing to power generation (power generating area) in the bipolar electrode, so as to be ordinarily formed in a region as described below and not to be formed in the central portion of the bipolar electrode, for example.

Here, the forming region of the reinforcing layer is described in further detail. The above-mentioned reinforcing layer is ordinarily formed inside an electrode active material layer forming region where the electrode active material layer is formed by reason of being disposed between the end of the electrode active material layer and the surface of the current collector. The width of the reinforcing layer formed inside the electrode active material layer forming region, that is, a laminate portion of the electrode active material layer and the reinforcing layer is not particularly limited if the width is such as to allow durability against the above-mentioned aberration shearing force to the current collector, but may be properly selected in accordance with uses of the bipolar all-solid-state battery of the present invention and other factors. More specifically, the ratio of the width of the above-mentioned laminate portion of the electrode active material layer and the reinforcing layer to the width of the electrode active material layer is preferably within a range of 0.01% to 30%, above all, within a range of 0.1% to 10%, and particularly, within a range of 1% to 5%. The reason therefor is that the case where the above-mentioned ratio is less than the above-mentioned range brings a possibility that so high precision is necessary for aligning positions of the electrode active material layer and the reinforcing layer that the production processes become complicated. On the other hand, the reason therefor is that the case where the above-mentioned ratio is more than the above-mentioned range brings a possibility that the power generating area in the bipolar electrode decreases and battery characteristics of the bipolar all-solid-state battery of the present invention deteriorate. Incidentally, the width of the laminate portion of the electrode active material layer and the reinforcing layer signifies a distance shown by L1 and L1' in FIGS. 2A and 2B. Also, the width of the electrode active material layer signifies a distance from one edge to the other edge opposite to the above-mentioned one edge of the electrode active material layer, and signifies a distance shown by L2 and L2' in FIGS. 2A and 2B.

In the present invention, the above-mentioned reinforcing layer is preferably formed continuously from the end of the current collector to the end of the electrode active material layer. The reason therefor is that the current collector located outside the end of the electrode active material layer may be covered with an insulating layer, and an exposed portion of the current collector may be decreased or lost, so that the bipolar all-solid-state battery such that a short circuit due to contact between the current collectors adjacent in a lamination direction is caused with difficulty may be obtained. Incidentally, this case requires that the above-mentioned reinforcing layer be an insulator.

Incidentally, "the reinforcing layer is formed continuously from the end of the current collector to the end of the electrode active material layer" in the present invention signifies that the reinforcing layer is formed continuously from the end of the current collector to the end of the cathode active material layer or the end of the anode active material layer.

Figure 3A:
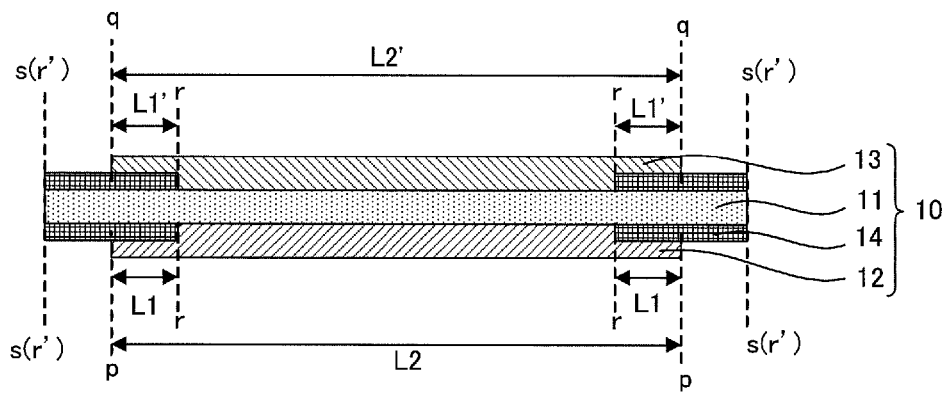
FIGS. 3A and 3B are each a schematic view showing another example of a bipolar electrode used for the present invention.
Figure 3B:
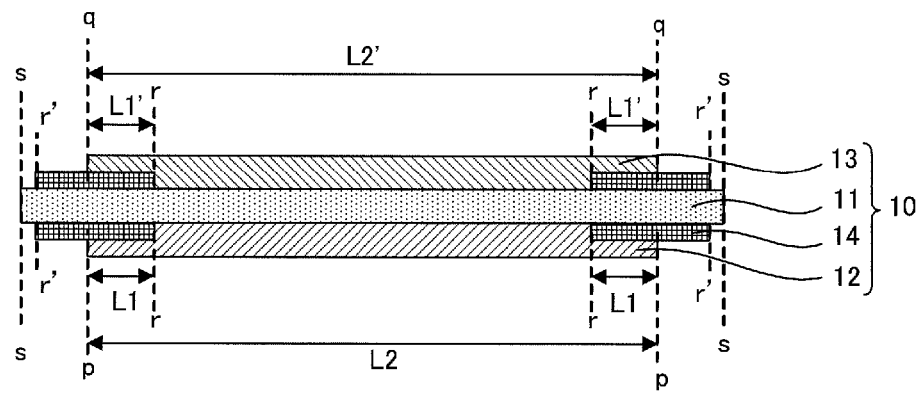

Also, in the present invention, "the reinforcing layer is formed continuously from the end of the current collector" is a concept including not merely the case where the reinforcing layer 14 is formed continuously on the surface of the current collector 11 so that the end "s" of the current collector 11 corresponds with the end "r'" of the reinforcing layer 14 (on the side of the end of the current collector), as shown in FIG. 3A, but also the case where the reinforcing layer 14 is formed continuously on the surface of the current collector 11 so that the end "r'" of the reinforcing layer 14 is located inside the end "s" of the current collector 11 to such a degree as to allow a short circuit due to contact between the current collectors adjacent in a lamination direction to be prevented in the bipolar all-solid-state battery of the present invention, as shown in FIG. 3B, and the case where the reinforcing layer 14 is formed continuously so as to cover the end "s" and the end face of the current collector 11, as shown in FIG. 2B. In the present invention, above all, the reinforcing layer 14 is preferably formed continuously so as to cover the end "s" and the end face of the current collector 11. The reason therefor is to allow a short circuit due to contact between the above-mentioned adjacent current collectors to be prevented more suitably. Incidentally, FIGS. 3A and 3B are schematic cross-sectional views each showing another example of the bipolar electrode used for the present invention, and undescribed reference numerals may be the same as FIG. 2B; therefore, the description herein is omitted.

Also, as described above, the present invention has the case where the reinforcing layer is formed inside the end of the electrode active material layer, so that "the reinforcing layer is formed continuously to the end of the electrode active material layer" is a concept including the case where the reinforcing layer is formed continuously to the end and the inside of the electrode active material layer.

Also, in the case where the above-mentioned reinforcing layer is formed continuously from the end of the current collector to the end of the electrode active material layer and formed on one of the surface of the current collector on the side of the cathode active material layer and the surface of the current collector on the side of the anode active material layer, the reinforcing layer is preferably formed on one of the surfaces of the current collectors of each opposite bipolar electrode in two bipolar electrodes adjacent in a lamination direction in the bipolar all-solid-state battery of the present invention. The reason therefor is to allow a short circuit due to contact between the current collectors adjacent in a lamination direction to be prevented more suitably.

The thickness of such a reinforcing layer is not particularly limited if the thickness is such as to allow durability against the above-mentioned aberration shearing force to the current collector and allow a short circuit due to contact between the current collectors adjacent in a lamination direction of the bipolar all-solid-state battery to be prevented, but is preferably within a range of 1 µm to 100 µm, above all, within a range of 5 µm to 50 µm, and particularly, within a range of 10 µm to 30 µm. The reason therefor is that the case where the thickness of the reinforcing layer is less than the above-mentioned range brings a possibility that durability against the above-mentioned aberration shearing force may not sufficiently provided for the current collector to cause breakage in the current collector. On the other hand, the reason therefor is that the case where the thickness of the reinforcing layer is more than the above-mentioned range occasionally makes it difficult to flatten the surface of the electrode active material layer by reason of a difference in level due to the thickness of the reinforcing layer.

A material for the reinforcing layer is not particularly limited if the material is such as to allow a desired durability to the current collector. As described above, the reinforcing layer is so preferably an insulator in the present invention that the material for the reinforcing layer is preferably an insulating material.

The above-mentioned insulating material is not particularly limited if the material has a desired insulating properties, but may be the same as a material for a reinforcing layer used for a general bipolar battery and is preferably a resin material above all. The resin material is high in durability against the above-mentioned shearing force and has extensibility, so that, for example, even in the case where breakage is caused in the current collector in a region where the reinforcing layer is formed, the extension of the reinforcing layer allows a short circuit to be suitably prevented from occurring for the reason that a through hole is caused in the current collector.

Examples of the resin material used for the above-mentioned reinforcing layer include polyester, polypropylene, polyamide, polystyrene, polyvinyl chloride and polycarbonate.

The above-mentioned reinforcing layer may have an adhesive layer on the surface on the side of the current collector. The reason therefor is to allow adhesive properties between the reinforcing layer and the current collector to be improved. Incidentally, a general tackiness agent may be used for a material for the adhesive layer; therefore, the description herein is omitted. Also, the thickness of the tackiness agent is preferably such that layer thickness of the lamination of the reinforcing layer and the adhesive layer is the above-mentioned thickness of the reinforcing layer.

A method for forming the above-mentioned reinforcing layer is not particularly limited if the method is a method such as to allow the reinforcing layer having a desired thickness to be formed in a desired region of the surface of the current collector, but examples thereof include a method for forming by applying the above-mentioned resin material, and a method for sticking a film using the above-mentioned resin material on the surface of the current collector while using the adhesive layer.

(2) Electrode Active Material Layer

The electrode active material layer in the present invention includes a cathode active material layer containing a cathode active material, formed on one surface of the above-mentioned current collector, and an anode active material layer containing an anode active material, formed on the other surface of the above-mentioned current collector.

(i) Cathode Active Material Layer

The cathode active material layer used for the present invention is formed on one surface of the current collector and contains a cathode active material.

A cathode active material layer forming region for forming the above-mentioned cathode active material layer is not particularly limited if the region is a region such as to be inside the end of the current collector, allow a desired power generating area to the bipolar electrode, and allow the reinforcing layer to be formed inside the end of the cathode active material layer. The cathode active material layer forming region is properly selected in accordance with uses of the bipolar all-solid-state battery of the present invention and other factors.

The above-mentioned cathode active material layer is a layer containing at least a cathode active material, and may contain at least one of a conductive material, a solid electrolyte material and a binder, as required. Examples of the cathode active material include $LiCoO_2$, $LiMnO_2$, $Li_2NiMn_3O_8$, $LiVO_2$, $LiCrO_2$, $LiFePO_4$, $LiCoPO_4$, $LiNiO_2$ and $LiNi_{1/3}Co_{1/3}Mn_{1/3}O_2$ in the case of a bipolar all-solid-state lithium battery.

The cathode active material layer in the present invention may further contain a conductive material. The addition of the conductive material allows conductivity of the cathode active material layer to be improved. Examples of the conductive material include acetylene black, Ketjen Black and carbon fiber. Also, the cathode active material layer may further contain a solid electrolyte material. The addition of the solid electrolyte material allows ion conductivity of the cathode active material layer to be improved. The solid electrolyte material may be the same as a material described in an item of the after-mentioned solid electrolyte layer. Also, the cathode active material layer may further contain a binder. Examples of the binder include a fluorine-containing binder such as polytetrafluoroethylene (PTFE). The thickness of the cathode active material layer is preferably within a range of 0.1 μm to 1000 μm, for example.

A method for forming the cathode active material layer is not particularly limited if the method is a method such as to allow the cathode active material layer having a desired thickness to be formed in a desired region of the surface of the current collector, but examples thereof include a method for forming by pressurizing a material for the cathode active material layer, and a method for forming by preparing slurry containing a material for the cathode active material layer and a solvent to apply the above-mentioned slurry on the surface of the current collector.

(ii) Anode Active Material Layer

The anode active material layer used for the present invention is formed on the surface of the current collector opposite to the side of the cathode active material layer and contains an anode active material.

An anode active material layer forming region for forming the above-mentioned anode active material layer is not particularly limited if the region is a region such as to be inside the end of the current collector, allow a desired power generating area to be the bipolar electrode, and allow the reinforcing layer to be formed inside the end of the anode active material layer. The anode active material layer forming region is properly selected in accordance with uses of the bipolar all-solid-state battery of the present invention and other factors.

Next, the anode active material layer in the present invention is described. The anode active material layer in the present invention is a layer containing at least an anode active material, and may contain at least one of a conductive material, a solid electrolyte material and a binder, as required. Examples of the anode active material include a metal active material and a carbon active material. Examples of the metal active material include In, Al, Si, and Sn. Examples of the carbon active material include mesocarbon microbeads (MCMB), high orientation property graphite (HOPG), hard carbon and soft carbon.

The conductive material, the solid electrolyte material and the binder used for the anode active material layer are the same as the case of the above-mentioned cathode active material layer. Also, the thickness of the anode active material layer is preferably within a range of 0.1 μm to 1000 μm, for example.

A method for forming the anode active material layer may be the same as the above-mentioned method for forming the cathode active material layer; therefore, the description herein is omitted.

(3) Current Collector

The current collector in the present invention is described. A material for the current collector in the present invention is not particularly limited if the material has conductivity and allows the cathode active material layer, the anode active material layer and the reinforcing layer to be formed on the surface of the current collector, and examples thereof include stainless steel, aluminum and copper.

Also, the thickness of the above-mentioned current collector may be properly selected in accordance with uses of the bipolar all-solid-state battery of the present invention and other factors; preferably, ordinarily within a range of 1 μm to 100 μm, above all within a range of 5 μm to 30 μm, and particularly within a range of 10 μm to 20 μm. Also, the thickness of the current collector is preferably thinner in the above-mentioned range. The reason therefor is that the effect of preventing a short circuit from occurring by breakage of the current collector may be performed further greatly. Also, the shape of the current collector may be properly selected in accordance with uses of the bipolar all-solid-state battery of the present invention and other factors.

(4) Bipolar Electrode

In the bipolar electrode used for the present invention, the electrode active material layer and the reinforcing layer are not formed ordinarily in the outer face (T face in FIG. 1) of the bipolar electrode located in the outermost layer of the bipolar all-solid-state battery.

Also, with regard to the bipolar electrode used for the present invention, the end of the current collector is preferably covered with an insulator. A short circuit due to contact between the current collectors adjacent in a lamination direction may be suitably prevented in the bipolar all-solid-state battery. Also, in this case, the above-mentioned insulator may be a film of an insulating material formed separately from the reinforcing layer, or the reinforcing layer formed continuously from the end of the current collector to the end of the electrode active material layer, but preferably the reinforcing layer. The reason therefor is to allow the production processes to be simplified as compared with the case of separately forming the above-mentioned film of an insulating material.

2. Solid Electrolyte Layer

A solid electrolyte layer used for the present invention has a solid electrolyte.

Also, the above-mentioned solid electrolyte layer is disposed between the cathode active material layer of a bipolar electrode and the anode active material layer of another bipolar electrode adjacent to the above-mentioned bipolar electrode in the bipolar all-solid-state battery. A forming region of such a solid electrolyte layer is not particularly limited if the region is a position such as to allow the solid electrolyte layer to be disposed between the above-mentioned cathode active material layer and anode active material layer, but, above all, the solid electrolyte layer 20 is preferably formed so as to cover the surface and the end face of the electrode active material layer (the anode active material layer 13 in FIG. 1), as shown in FIG. 1. The reason therefor is to allow a short circuit of the bipolar all-solid-state battery to be prevented more suitably.

A solid electrolyte material composing the solid electrolyte layer is not particularly limited if the material has ion conductivity, but examples thereof include oxide amorphous solid electrolyte materials such as $Li_2O$—$B_2O_3$—$P_2O_5$, $Li_2O$—$SiO_2$, $Li_2O$—$B_2O_3$ and $Li_2O$—$B_2O_3$—$ZnO$, sulfide amorphous solid electrolyte materials such as $Li_2S$—$SiS_2$, $LiI$—$Li_2S$—$SiS_2$, $LiI$—$Li_2S$—$P_2S_5$, $LiI$—$Li_2S$—$B_2S_3$, $Li_3PO_4$—$Li_2S$—$Si_2S$, $Li_3PO_4$—$Li_2S$—$SiS_2$, $Li_3PO_4$—$Li_2S$—$SiS$, $LiI$—$Li_2S$—$P_2O_5$, $LiI$—$Li_3PO_4$—$P_2S_5$ and $Li_2S$—$P_2S_5$, and crystalline oxides and oxynitrides such as $LiI$, $LiI$—$Al_2O_3$, $Li_3N$, $Li_3N$—$LiI$—$LiOH$, $Li_{1+x}Al_xTi_{2-x}(PO_4)_3$ ($0 \leq x \leq 2$), $Li_{1+x+y}A_xTi_{2-x}Si_yP_{3-y}O_{12}$ (A=Al or Ga, $0 \leq x \leq 0.4$, $0 \leq y \leq 0.6$), $[(A_{1/2}Li_{1/2})_{1-x}B_x]TiO_3$ (A=La, Pr, Nd, Sm, B=Sr or Ba, $0 \leq x \leq 0.5$), $Li_5La_3Ta_2O_{12}$, $Li_7La_3Zr_2O_{12}$, $Li_6BaLa_2Ta_2O_{12}$, $Li_3PO_{(4-3/2x)}N_x$ (x<1) and $Li_{3.6}Si_{0.6}P_{0.4}O_4$ in the case where the bipolar all-solid-state battery of the present invention is a bipolar all-solid-state lithium battery.

Also, the solid electrolyte layer may contain a binder in addition to the above-mentioned solid electrolyte material. Incidentally, the binder may be the same as the one used for the above-mentioned cathode active material layer; therefore, the description herein is omitted.

The thickness of the solid electrolyte layer is, for example, preferably within a range of 0.1 μm to 1000 μm, and above all within a range of 0.1 μm to 300 μm.

A method for forming the solid electrolyte layer is not particularly limited but examples thereof include a method for forming by pressurizing a material for the solid electrolyte layer, and a method for forming by preparing slurry containing a material for the solid electrolyte layer and a solvent to apply the above-mentioned slurry on the current collector where the electrode active material layer is formed. Above all, the method for forming is preferably the method by applying the slurry. The reason therefor is to facilitate the formation of the solid electrolyte layer such as to cover the electrode active material layer.

3. Other Constitutions

A bipolar all-solid-state battery of the present invention has at least the above-mentioned bipolar electrode and solid electrolyte layer. Further, a battery case is ordinarily used. A battery case of a general bipolar all-solid-state battery may be used as a battery case used for the present invention, and examples thereof include a battery case made of SUS.

4. Bipolar all-Solid-State Battery

A bipolar all-solid-state battery of the present invention is such that a plurality of the bipolar electrodes is laminated via the above-mentioned solid electrolyte layer. The number of laminating of the above-mentioned bipolar electrodes is properly selected in accordance with uses of the bipolar all-solid-state battery of the present invention and other factors.

Examples of kinds of the bipolar all-solid-state battery (kinds of the all-solid-state battery) of the present invention include an all-solid-state lithium battery, an all-solid-state sodium battery, an all-solid-state magnesium battery and an all-solid-state calcium battery; above all, preferably an all-solid-state lithium battery and an all-solid-state sodium battery, and particularly, preferably an all-solid-state lithium battery. Also, the all-solid-state battery of the present invention may be a primary battery or a secondary battery, and preferably a secondary battery among them. The reason therefor is to be repeatedly charged and discharged and be useful as a car-mounted battery, for example. Examples of the shape of the all-solid-state battery of the present invention include a coin shape, a laminate shape, a cylindrical shape and a rectangular shape.

Also, a producing method for the bipolar all-solid-state battery of the present invention is not particularly limited; for example, a method described in an item of the after-mentioned "B. Method for producing bipolar all-solid-state battery" may be used.

B. Method for Producing Bipolar all-Solid-State Battery

Next, a method for producing the bipolar all-solid-state battery of the present invention is described.

The method for producing the bipolar all-solid-state battery of the present invention is the method for producing the bipolar all-solid-state battery described in an item of the above-mentioned "A. Bipolar all-solid-state battery", comprising steps of: a bipolar electrode forming step of forming the reinforcing layer on the surface of the current collector so that the above-mentioned reinforcing layer is disposed between the end of an electrode active material layer forming region located inside the end of the above-mentioned current collector, where the electrode active material layer is formed, and the surface of the above-mentioned current collector to thereafter form the bipolar electrode by forming the above-mentioned electrode active material layer in the above-mentioned electrode active material layer forming region; a solid electrolyte layer forming step of forming the solid electrolyte layer; and an assembling step of assembling the bipolar all-solid-state battery by laminating the plurality of the above-mentioned bipolar electrodes via the above-mentioned solid electrolyte layer.

Figure 4A:
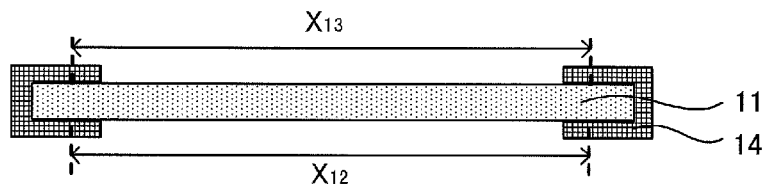
FIGS. 4A to 4D are a process drawing showing an example of a method for producing a bipolar all-solid-state battery of the present invention.
Figure 4B:
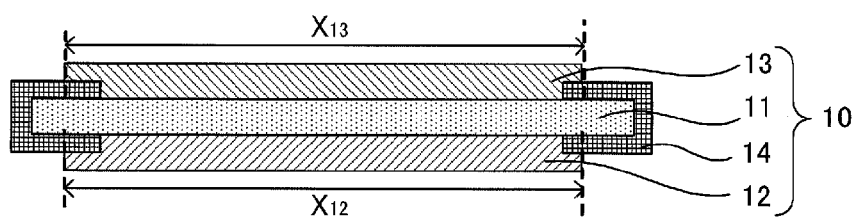
Figure 4C:
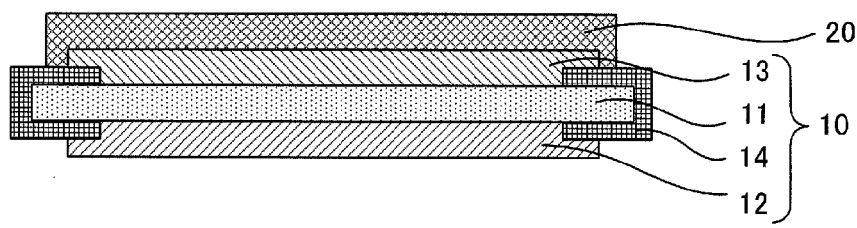
Figure 4D:
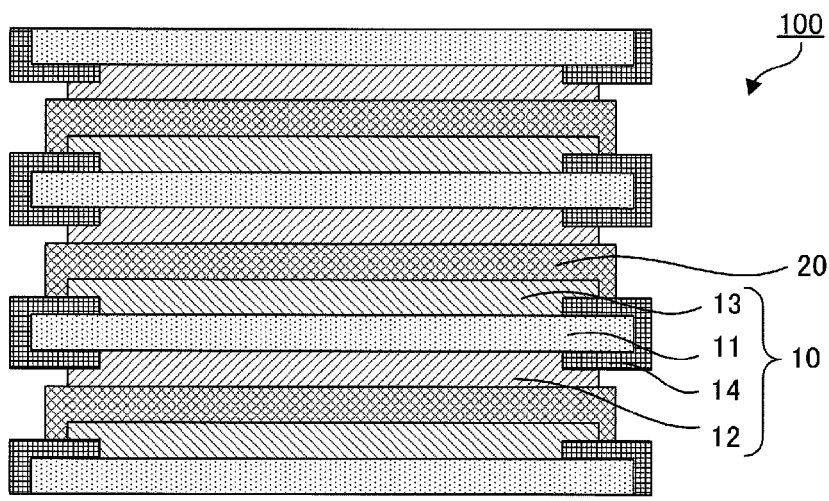

Here, the method for producing the bipolar all-solid-state battery of the present invention is described while using the drawings. FIGS. 4A to 4D are process drawings showing an example of the method for producing the bipolar all-solid-state battery of the present invention. In the method for producing the bipolar all-solid-state battery of the present invention, first, in the bipolar electrode forming step, as shown in FIG. 4A, in one surface of the current collector 11, the reinforcing layer 14 is formed on the surface of the current collector 11 continuously from the end of the current collector 11 to the end of a cathode active material layer forming region $X_{12}$ so that the reinforcing layer 14 is disposed between the end of the cathode active material layer forming region $X_{12}$ located inside the end of the current collector 11, where the cathode active material layer is formed, and the surface of the current collector 11. Also, similarly, in the other surface of the current collector 11, the reinforcing layer 14 is formed on the surface of the current collector 11 continuously from the end of the current collector 11 to the end of an anode active material layer forming region $X_{13}$ so that the reinforcing layer 14 is disposed between the end of the anode active material layer forming region $X_{13}$, where the anode active material layer is formed, and the surface of the current collector 11. Next, as shown in FIG. 4B, the bipolar electrode 10 is formed by forming the cathode active material layer 12 and the anode active material layer 13 in the cathode active material layer forming region $X_{12}$ and the anode active material layer forming region $X_{13}$, respectively. Next, in the solid electrolyte layer forming step, as shown in FIG. 4C, the solid electrolyte layer 20 is formed so as to cover the anode active material layer 13. Next, in the assembling step, the bipolar all-solid-state battery 100 is assembled by laminating a plurality of the bipolar electrodes 10 via the solid electrolyte layer 20. Although not shown in the drawings, the bipolar all-solid-state battery shown in FIG. 1 may be obtained by sealing the assembled bipolar all-solid-state battery into a battery case to dispose a restraint jig.

According to the present invention, the reinforcing layer may be disposed between the end of the electrode active material layer and the surface of the current collector by having the bipolar electrode forming step, so that the current collector in the vicinity of the end of the electrode active material layer may be reinforced, and durability against the above-mentioned aberration shearing force may be provided for the current collector. Therefore, the bipolar all-solid-state battery such that a short circuit due to breakage of the current collector is caused with difficulty may be produced.

The method for producing the bipolar all-solid-state battery of the present invention is hereinafter described.

1. Bipolar Electrode Forming Step

The bipolar electrode forming step in the present invention is a step of forming a reinforcing layer on the surface of a current collector so that the reinforcing layer is disposed between the end of an electrode active material layer forming region located inside the end of the above-mentioned current collector, where an electrode active material layer is formed, and the surface of the above-mentioned current collector to thereafter form a bipolar electrode by forming the above-mentioned electrode active material layer in the above-mentioned electrode active material layer forming region.

In the case where the bipolar electrode formed by the present step has the reinforcing layer on both surfaces, the present step may be a step of forming the reinforcing layer on the surface of the current collector to thereafter form the cathode active material layer or the anode active material layer on each surface of the current collector, or a step of forming the reinforcing layer on one surface of the current collector to thereafter form one of the cathode active material layer and the anode active material layer on the surface of the current collector where the reinforcing layer is formed and further forming the reinforcing layer on the other surface of the current collector to thereafter form the unformed one of the cathode active material layer and the anode active material layer.

Also, in the present step, the reinforcing layer is preferably formed continuously from the end of the current collector to the end of the electrode active material layer. The reason therefor is that the current collector located outside the end of the electrode active material layer may be covered with the reinforcing layer, and an exposed portion of the current collector may be decreased or lost, so that the bipolar all-solid-state battery such that a short circuit due to contact between the current collectors adjacent in a lamination direction is caused with difficulty may be produced.

Incidentally, a forming position of the reinforcing layer, a forming region of the reinforcing layer, the reinforcing layer to be formed and a forming method therefor, the electrode active material layer and a forming method therefor, and the bipolar electrode in the present step may be the same as the contents described in an item of the above-mentioned "A. Bipolar all-solid-state battery"; therefore, the description herein is omitted.

2. Solid Electrolyte Layer Forming Step

The solid electrolyte layer forming step in the present invention is a step of forming a solid electrolyte layer. Incidentally, the solid electrolyte layer to be formed by the present step and a forming method therefor may be the same as the contents described in an item of the above-mentioned "A. Bipolar all-solid-state battery"; therefore, the description herein is omitted.

3. Assembling Step

The assembling step in the present invention is an assembling step of assembling a bipolar all-solid-state battery by laminating a plurality of the above-mentioned bipolar electrodes via the above-mentioned solid electrolyte layer. A method for assembling the bipolar all-solid-state battery used for the present step is not particularly limited if the method is a method such as to allow a plurality of the above-mentioned bipolar electrodes to be laminated via the above-mentioned solid electrolyte layer, but a publicly known method may be used. Also, the bipolar all-solid-state battery obtained by the present step may be the same as the contents described in an item of the above-mentioned "A. Bipolar all-solid-state battery"; therefore, the description herein is omitted.

4. Other Steps

Necessary steps except each of above-mentioned steps may be properly selected and performed in the method for producing the bipolar all-solid-state battery of the present invention. Examples of such steps include a step of sealing the bipolar all-solid-state battery into a battery case and a step of disposing a restraint jig.

Incidentally, the present invention is not limited to the above-mentioned embodiments. The above-mentioned embodiments are exemplification, and any is included in the technical scope of the present invention if it has substantially the same constitution as the technical idea described in the claim of the present invention and offers similar operation and effect thereto.

Examples

The present invention is described more specifically while showing examples hereinafter.

An SUS304 foil with a thickness of 10 μm was prepared as a current collector and a PEN film with a thickness of 12 μm was thermocompression-bonded as a reinforcing layer in the outer periphery of the SUS304 foil. Incidentally, the reinforcing layer was thermocompression-bonded on both surfaces of the current collector.

Next, $LiNi_{1/3}Co_{1/3}Mn_{1/3}O_2$ (cathode active material), $75Li_2S$-$25P_2S_5$ (solid electrolyte), butylene rubber (manufactured by JSR Corporation) (binder) and heptane (solvent) were mixed at amass ratio of cathode active material:solid electrolyte:binder:heptane=47:16:1:36 and kneaded into a state of slurry, which was applied and dried on the current collector so that the reinforcing layer was formed inside the end of a cathode active material layer to thereby obtain the cathode active material layer with a thickness of 60 μm.

Natural graphite (anode active material), $75Li_2S$-$25P_2S_5$ (solid electrolyte), butylene rubber (manufactured by JSR Corporation) (binder) and heptane (solvent) were mixed at amass ratio of anode active material:solid electrolyte:binder:heptane=40:30:0.2:29.8 and kneaded into a state of slurry, which was applied and dried on the current collector on the opposite side to the side, where the cathode active material layer was formed, so that the reinforcing layer was formed inside the end of the cathode active material layer to thereby obtain an anode active material layer with a thickness of 80 μm.

$75Li_2S$-$25P_2S_5$ (solid electrolyte), butylene rubber (manufactured by JSR Corporation) (binder) and heptane (solvent) were mixed at a mass ratio of solid electrolyte:binder:heptane=34.5:0.5:65 and kneaded into a state of slurry, which was applied and dried so as to completely cover the anode active material layer of the current collector to thereby obtain a solid electrolyte layer with a thickness of 20 μm.

As described above, a bipolar electrode was produced by four pieces, and the bipolar electrodes were laminated so that the solid electrolyte layer was disposed between the cathode active material layer of a bipolar electrode and the anode layer of a bipolar electrode adjacent to the above-mentioned bipolar electrode. Incidentally, the reinforcing layer, the electrode active material layer and the solid electrolyte layer were not formed in the outer face of the bipolar electrode disposed in the outermost layer.

An obtained bipolar all-solid-state battery was put in an aluminum-laminate film and sealed. Also, the battery was fastened by a restraint jig having a structure such as to allow the above-mentioned aluminum-laminate film to be loaded. Thus, the bipolar all-solid-state battery was obtained.

EVALUATIONS

The fastened bipolar all-solid-state battery was subject to repetitive charge and discharge at a current density of 4.8 mA/cm$^2$ in a voltage range of 4.2 V to 2 V.

The incidence rate of breakage of the current collector may be decreased by making the bipolar all-solid-state battery into the above-mentioned structure.

REFERENCE SIGNS LIST

10 . . . bipolar electrode
11 . . . current collector
12 . . . cathode active material layer
13 . . . anode active material layer
14 . . . reinforcing layer
20 . . . solid electrolyte layer
100 . . . bipolar all-solid-state battery
p . . . end of cathode active material layer
q . . . end of anode active material layer
r, r' . . . end of reinforcing layer
s . . . end of current collector $X_{12}$ ... cathode active material layer forming region
$X_{13}$ ... anode active material layer forming region

The invention claimed is:

1. A bipolar all-solid-state battery, comprising:
a plurality of bipolar electrodes, each of the bipolar electrodes comprising:
   a current collector and an electrode active material layer comprising a cathode active material layer containing a cathode active material, formed on a first surface of the current collector, and an anode active material layer containing an anode active material, formed on a second surface of the current collector;
   a reinforcing layer as an insulator formed on the first surface or the second surface of the current collector is disposed between an end of the electrode active material layer and the first surface or the second surface of the current collector; and
   a solid electrolyte layer containing a solid electrolyte, wherein
the plurality of bipolar electrodes are laminated via the solid electrolyte layer,
the electrode active material layer is formed inside an end of the current collector, and
the end of the electrode active material layer, the reinforcing layer, and the current collector are sequentially disposed in a thickness direction of the electrode.

2. The bipolar all-solid-state battery according to claim 1, wherein the end of the current collector is covered with the insulator.

3. A method for producing the bipolar all-solid-state battery according to claim 1, comprising steps of:
   forming the reinforcing layer, which is the insulator, on the surface of the current collector so that the reinforcing layer is disposed between an end of an electrode active material layer forming region located inside the end of the current collector, where the electrode active material layer is formed, and the surface of the current collector to thereafter form the bipolar electrode by forming the electrode active material layer in the electrode active material layer forming region;
   forming the solid electrolyte layer; and
   assembling the bipolar all-solid-state battery by laminating the plurality of the bipolar electrodes via the solid electrolyte layer.

4. The bipolar all-solid-state battery according to claim 1, wherein the reinforcing layer is formed on the first surface and the second surface of the current collector and is disposed (i) between the end of the electrode active material layer and the first surface of the current collector and (ii) between the end of the electrode active material layer and the second surface of the current collector.

* * * * *